United States Patent [19]

Howard

[11] Patent Number: 4,598,112

[45] Date of Patent: Jul. 1, 1986

[54] LOW TACK CATIONIC MICROSPHERE GLUE

[75] Inventor: Philip H. Howard, Jamesville, N.Y.

[73] Assignee: International Cube Corp., Syracuse, N.Y.

[21] Appl. No.: 650,448

[22] Filed: Sep. 14, 1984

[51] Int. Cl.$^4$ ............................................. C08K 11/00
[52] U.S. Cl. ..................................... 524/78; 523/223; 524/460
[58] Field of Search .................. 524/78, 460; 523/223

[56] References Cited

U.S. PATENT DOCUMENTS 3,954,967  5/1976  Urton .................................... 424/81
4,166,152  8/1979  Baker et al. ......................... 524/832
4,215,162  7/1980  Kunnen et al. ..................... 524/724
4,495,318  1/1985  Howard ............................. 524/460

Primary Examiner—Joseph L. Schofer
Assistant Examiner—J. M. Reddick
Attorney, Agent, or Firm—Bruns and Wall

[57] ABSTRACT

Inherently tacky, elastomeric, solvent-dispersible, solvent-insoluble, polymeric microspheres prepared using a cationic emulsifier. The tacky microspheres are particularly adapted for use as a low tack microsphere glue that can be applied to a sheet material substrate whereby the latter is provided with a reusable adhesive surface.

1 Claim, No Drawings

LOW TACK CATIONIC MICROSPHERE GLUE

RELATED APPLICATION

This application is related as to subject matter to copending application Ser. No. 591,948, filed Mar. 21, 1984, now U.S. Pat. No. 4,495,318, by Philip H. Howard for Low Tack Microsphere Glue. Said copending application is owned by the assignee of the present invention.

BACKGROUND OF THE INVENTION

This invention relates generally to tacky polymeric microspheres, and has particular reference to inherently tacky, elastomeric, solvent-dispersible, solvent-insoluble, polymeric microspheres and a process for preparing same using a cationic emulsifier.

In U.S. Pat. No. 4,166,152, granted Aug. 28, 1979 to W. A. Baker et al., there is a disclosure of inherently tacky acrylate homopolymer microspheres prepared by aqueous suspension polymerization techniques utilizing a suspension stabilizer and an anionic emulsifier. The microspheres prepared by this method had an average particle size of 10-60 microns. The anionic emulsifiers retard particle coalescense by surrounding the particle with a negatively charged double layer which provides repulsion of the individual particles.

The inherently tacky, negatively charged microspheres disclosed by Baker have desirable properties in many applications where a low tack, reusable adhesive surface is desirable. All of these applications require that the microspheres be attached to sheet material as is disclosed for copolymer microspheres in U.S. Pat. No. 3,857,731, granted Dec. 31, 1974 to R. F. Merrill, Jr. et al. The Merrill et al patent suggests that copolymer microspheres, which also were prepared with an anionic emulsifier, can be anchored to the sheet material using a film-forming binder in which the copolymer microspheres are embedded. For some applications, it is desirable to have microspheres that are cationically (positively) charged to facilitate attachment to the sheet material. For example, paper has a slight anionical charge which should bond strongly to cationically charge microspheres. Comparisons of anionic and cationic surfactant microspheres coated on paper from a hexane solution demonstare that the cationic microspheres are tightly bonded to paper and do not have the transferance problems frequently noted with the anionic microspheres.

Other pertinent prior patents of which the applicant is aware are U.S. Pat. Nos. 3,513,120; 3,691,140; 3,857,731; 4,049,483 and 4,049,604.

SUMMARY OF THE INVENTION

The present invention is directed to inherently tacky microspheres having similar properties to those disclosed by the Baker patent but which are prepared using a cationic emulsifier. The tacky microspheres provided by the invention are particularly adapted for use as a low tack microsphere glue that can be applied to a sheet material substrate whereby the latter is provided with a reusable adhesive surface especially on paper.

DESCRIPTION OF THE PREFERRED EMBODIMENT

In the present invention, the low tack microsphere glue is essentially comprised of inherently tacky, elastomeric, solvent-dispersible, solvent-insoluble, polymeric microspheres (having an average particle size of 20-60 microns) prepared using a cationic emulsifier. The microspheres are derived from non-ionic monomers and included a water emulsifiable methacrylate ester or alkyl acrylate. The microspheres are prepared by aqueous suspension polymerization techniques using a suspension stabilizer and, as noted, a cationic emulsifier.

In a preferred embodiment of the invention, the monomer is 2-ethylhexyl acrylate, the stabilizer is an aqueous solution of polyacrylic acid, and the cationic emulsifier is an ethoxylated tallow amine. A catalyst is also employed in the polymerization of the monomer, the catalyst being a benzoyl peroxide in the preferred embodiment.

EXAMPLE 1

To a 5 liter, 3-necked Morton flask equipped with thermometer, mechanical stirrer, reflux condenser, and a vacuum and nitrogen inlet tube, were added 2820 grams of deionized or distilled water and 54 grams of Carbopol EX-17 (trademark for a 15% active aqueous solution of polyacrylic acid of 300,000-500,000 molecular weight range commercially available from the B. F. Goodrich Co.). The contents of the flask were then mixed to dissolve the EX-17. Concentrated ammonium hydroxide was then added to the mixture until a pH of 7.0 was achieved.

To this solution were added 3.5 grams of Lucido-70 (trademark for a 70% active benzoyl peroxide in water; granular, bulk density—55 lbs/ft.$^3$, freezing point less than 32° F.; commercially available from Lucidol Division, Penwalt Corp.), 1000 grams of 2-ethylhexyl acrylate, and 30 grams of Trymeen TAM-20 (trademark for an ethoxylated tallow amine, (20 average moles of ethylene oxide) cationic surfactant (liquid at 25° C., pour pt. −2° C., HLB=15.4, viscosity at 100° F.=119 cSt), commerically available from Emery Industries, Inc.). Vacuum was then drawn upon the contents of the flask, the pressure therein being drawn to approximately 25 inches of mercury, and held for approximately fifteen minutes (while the mixture is stirred via vacuum tight stir assembly) to assure removal of dissolved air and oxygen. The vacuum was then broken with nitrogen. A nitrogen purge was maintained throughout the emulsion and polymerization steps. Agitation for the mixture was set at 300 r.p.m.

The batch was then heated to 60° C. and maintained for 16 hours. As the temperature initially approached 60° C., a mild exotherm was noted which raised the temperature to approximately 70° C. After 16 hour period, the suspension was passed through a 250 micron screen. The resultant homopolymer aqueous emulsion contained apporixmately 26.3% solids. Upon standing, the polymer spheres creamed to the surface, but were readily dispersed by agitating the mixture. Particle size ranged from 15-60 microns, with the average size approximately 35 microns.

Average tack level for the microsphere glue is 98 grams of tack as determined by a Polyken, Jr. Probe Track tester. The Polyken, Jr. tester is manufactured by Testing Machines, Inc., under license from the Kendall Corp., and coating was accomplished by drawdown technique using a No. 20 wirewound rod. Values represent averages obtained from several testings of the coated paper. Conditions of testing are as follows:

Contact time: 1 second

Separation time: 1 cm/sec
Contact pressure: 100 g/cm$^2$
Probe tye: ½ cm diameter 304 stainless steel tip—280 grit abrasive finish
Temperature: approximately 22.5° C.
Further information on the Polyken probe tack tester may be found in ASTM D29 79 Section 15.06, 1983.

EXAMPLE 2

Aqueous microspheres of the preferred embodiment as well as microspheres synthesized with an anionic emulsifier Siponate DS-10 (sodium dodecyl benzene sulfonate, commercially available from Alcolac, Inc.) as desdribed by Baker et al, U.S. Pat. No. 4,166,152, were each coagulated with methanol, and then rinsed with methanol to drive off the water. Samples of each were placed in a forced air oven at 150° F. for 30 minutes and then placed in a desiccator to cool. Fifteen grams of the dried spheres were then placed in respective 600 ml beakers to which was added 200 ml of hexane. The samples were stirred with a magnetic stir bar until the spheres were fully redispersed in the solvent.

Samples of each dispersion were then coated onto unprimed and untreated 50 lb. James River Mill paper with a No. 36 wire wound rod to produce coating weights which ranged from 1.5–2.5 lbs./300 sq. ft. Samples were dried in a forced air oven for 5 minutes at 150° F. and then cooled on the lab bench for approximately 30 minutes.

Samples measuring 11.25 sq. in. were cut from the coated papers and pressed by hand onto both Hammermill Xerox paper and Westvaco 50 lb. Clear Spring paper. Samples were pressed with both light and firm pressure by hand. In all cases, the microspheres synthesized with the cationic emulsifier showed no sign of transfer to the uncoated test papers, whereas those microspheres prepared with the anionic emulsifier transferred to a significant degree in each test. The nontionic micropsheres transferred in an increasing amount with heavier pressure, whereas the cationic microspheres did not transfer with even the heaviest pressure exerted by hand.

From the foregoing description it will be apparent that the invention provides an improved low tack microsphere glue having advantages over the prior art. As will be understood by those familiar with the art, the invention may be embodied in other specific forms without departing from the spirit or essential characteristics thereof.

I claim :

1. A low tack microsphere containing glue suspension for application to a substrate to provide a reusable adhesive surface, wherein the microspheres are surrounded by a cationic surfactant which prevents particle coalescence, prepared according to the process comprising the steps of:

admixing, in approximate parts by weight, 2820 parts water; 54 parts of a 15% aqueous solution of polyacrylic acid having a molecular weight of 300,000 to 500,000 until said acid is dissolved, to form a solution;

raising the pH of said solution to 7.0 by adding concentrated ammonium hydroxide thereto;

adding 3.5 parts of a 70% active benzoyl peroxide catalyst, 1000 parts 2-ethylhexyl acrylate and 30 parts of an ethoxylated tallow amine to said solution to form a mixture;

holding said mixture under a vacuum of about 25 inches of mercury with stirring for about 15 minutes;

heating said mixture to about 60° C. for about 16 hours to form an aqueous suspension; and passin said suspension through a 250 micron screen to remove a small amount of unsuitable larger particle agglomerates.

* * * * *